United States Patent
Yoshida

(10) Patent No.: US 7,010,160 B1
(45) Date of Patent: Mar. 7, 2006

(54) BACKLIGHT SCENE JUDGING METHOD

(75) Inventor: Hiroki Yoshida, Kyoto (JP)

(73) Assignee: Konica Minolta Co., Ltd., Osaka (JP)

( * ) Notice: Subject to any disclaimer, the term of this patent is extended or adjusted under 35 U.S.C. 154(b) by 0 days.

(21) Appl. No.: 09/334,420

(22) Filed: Jun. 16, 1999

(30) Foreign Application Priority Data

Jun. 16, 1998 (JP) ................................. 10-168761

(51) Int. Cl.
*G06K 9/00* (2006.01)
*G03B 7/00* (2006.01)

(52) U.S. Cl. .................... 382/162; 382/167; 348/362
(58) Field of Classification Search ................ 382/164; 348/362–366, 229; 358/513, 514, 520
See application file for complete search history.

(56) References Cited

U.S. PATENT DOCUMENTS

| | | | |
|---|---|---|---|
| 5,296,920 A * | 3/1994 | Sakaue et al. ............... | 348/675 |
| 5,396,288 A * | 3/1995 | Tsugita et al. ............... | 348/229 |
| 5,497,431 A * | 3/1996 | Nakamura ................... | 382/162 |
| 5,715,377 A   | 2/1998 | Fukushima et al. ......... | 395/109 |
| 5,737,045 A * | 4/1998 | Abileah ....................... | 349/104 |
| 5,745,156 A * | 4/1998 | Federico et al. ............. | 347/256 |
| 5,825,917 A * | 10/1998 | Suzuki ........................ | 382/164 |
| 5,880,782 A * | 3/1999 | Koyanagi et al. ........... | 348/364 |
| 5,881,171 A * | 3/1999 | Kinjo .......................... | 382/199 |
| 5,940,530 A * | 8/1999 | Fukushima et al. ......... | 382/164 |
| 6,101,271 A * | 8/2000 | Yamashita et al. .......... | 382/167 |
| 6,101,273 A * | 8/2000 | Matama ...................... | 382/169 |
| 6,122,076 A * | 9/2000 | Shiota ........................ | 358/447 |

FOREIGN PATENT DOCUMENTS

| | | |
|---|---|---|
| JP | 04-346334 | 12/1992 |
| JP | 06-086156 | 8/1994 |
| JP | 08-062741 | 3/1996 |

\* cited by examiner

*Primary Examiner*—Samir Ahmed
*Assistant Examiner*—Brian Le
(74) *Attorney, Agent, or Firm*—Morrison & Foerster LLP

(57) ABSTRACT

In an image processing apparatus processing digitized image data taken by a digital camera, or the like, an image focused on an image pickup device is divided into a plurality of rectangular regions. A value of the lightness with respect to each rectangular region and a distribution of the color saturation are calculated by using image data. The scene of the image is judged whether it is backlighted or not by using a number of the rectangular regions having the value of the lightness equal to or larger than a threshold value. When the scene is judged as the backlight scene, it is further judged whether it is actually backlighted or not by using the distribution of the color saturation.

26 Claims, 10 Drawing Sheets

FIG. 4

| FILE / RANK | 1 | 2 | 3 | 4 | 5 | 6 | 7 | 8 |
|---|---|---|---|---|---|---|---|---|
| 1 | 7 | 7 | 7 | 7 | 7 | 7 | 8 | 8 |
| 2 | 7 | 7 | 7 | 1 | 1 | 7 | 8 | 8 |
| 3 | 7 | 7 | 1 | 1 | 1 | 7 | 7 | 7 |
| 4 | 7 | 7 | 1 | 0 | 0 | 7 | 7 | 7 |
| 5 | 7 | 7 | 1 | 0 | 0 | 6 | 7 | 7 |
| 6 | 7 | 6 | 6 | 0 | 0 | 6 | 6 | 6 |
| 7 | 7 | 6 | 1 | 0 | 0 | 1 | 6 | 6 |
| 8 | 7 | 6 | 1 | 0 | 0 | 1 | 1 | 6 |

FIG. 5

| FILE / RANK | 1 | 2 | 3 | 4 | 5 | 6 | 7 | 8 |
|---|---|---|---|---|---|---|---|---|
| 1 | 0 | 0 | 0 | 0 | 0 | 0 | 1 | 1 |
| 2 | 0 | 0 | 0 | 2 | 2 | 0 | 1 | 1 |
| 3 | 0 | 0 | 2 | 2 | 2 | 0 | 0 | 0 |
| 4 | 0 | 0 | 2 | 3 | 3 | 0 | 0 | 0 |
| 5 | 0 | 0 | 2 | 3 | 3 | 4 | 0 | 0 |
| 6 | 0 | 5 | 5 | 3 | 3 | 4 | 4 | 4 |
| 7 | 0 | 5 | 6 | 3 | 3 | 7 | 4 | 4 |
| 8 | 0 | 5 | 6 | 3 | 3 | 7 | 7 | 4 |

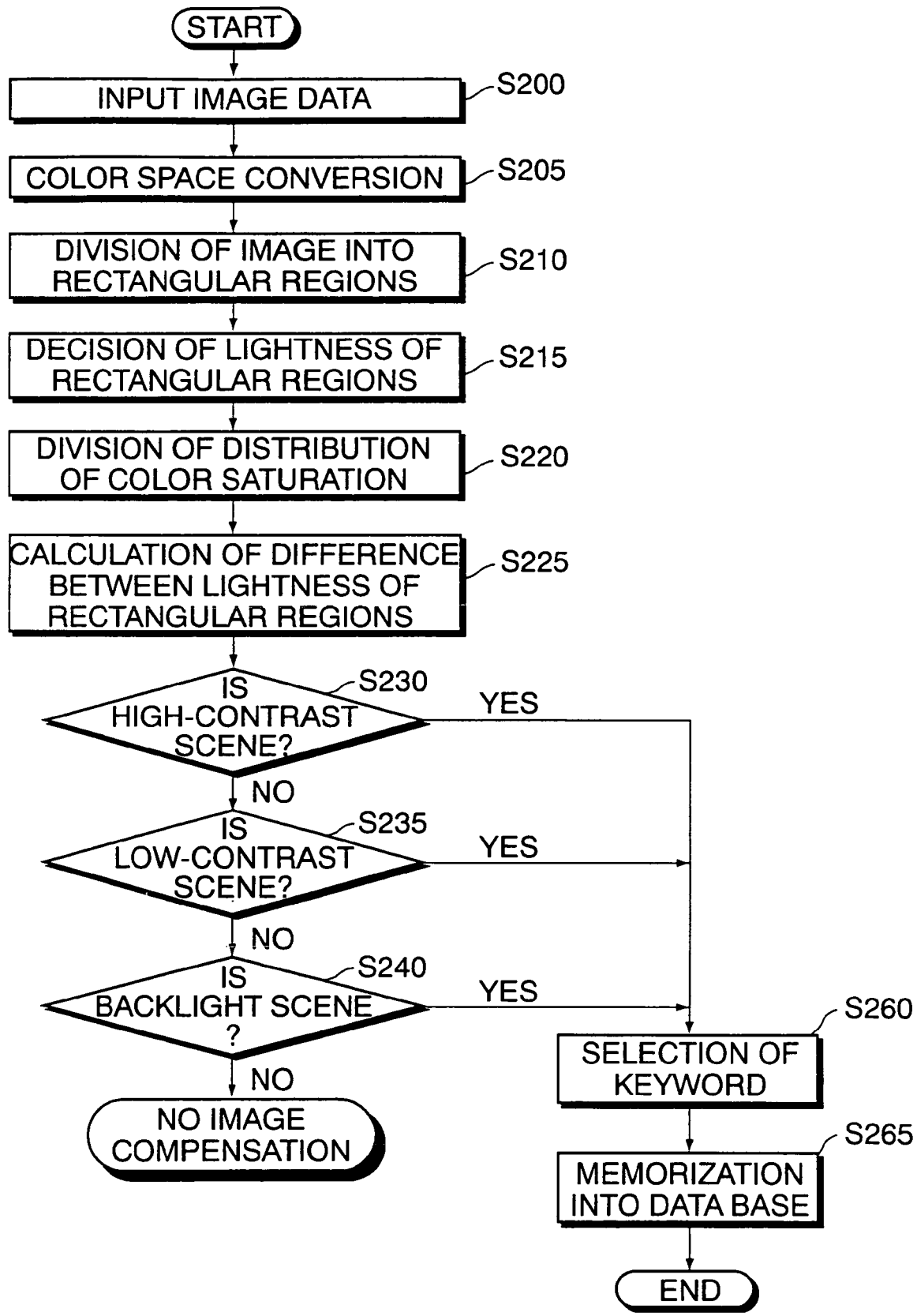

BACKLIGHT SCENE JUDGING METHOD

This application is based on patent application Hei. 10-168761 filed in Japan, the content of which is hereby incorporated by references.

BACKGROUND OF THE INVENTION

1. Field of the Invention

The present invention relates to a backlight scene judging method for judging whether a scene, which is taken by a digital camera or a scanner having a color solidstate image pickup device, is backlighted or not.

2. Description of the Prior Art

In a backlight scene, a very bright portion such as a light source generally exists behind a main object, and the main object is shaded. When an exposure of a camera is automatically controlled under the backlight scene, a luminance sensor such as an exposure meter or a solidstate image pickup device is affected by a luminance of the bright portion. Thus, a portion of a film or the solidstate image pickup device corresponding to the main object is insufficiently exposed.

Conventionally, it is proposed that the backlight scene is automatically sensed by the camera and an exposure condition based on an output of the luminance sensor is compensated. For example, a picture frame of the image pickup device is divided into a plurality of regions, and a luminance is sensed with respect to each region. A ratio of a number of dark regions having values of the luminance smaller than a threshold value to a number of bright regions having values of the luminance equal to or larger than the threshold value is obtained. The camera judges whether the scene is backlight or not by corresponding to the ratio.

However, when a dark portion except the main object exists in the picture field, the above-mentioned ratio becomes larger. As a result, the camera erroneously judges the scene is backlighted even though it is not backlighted.

SUMMARY OF THE INVENTION

A purpose of the present invention is to provide a backlight scene judging method for judging whether the scene is backlighted or not without misjudging the scene including the dark portion except the main object but being not backlighted as the backlight scene.

A backlight scene judging method in accordance with the present invention comprises the steps of: a first judgement sensing lightness with respect to a plurality of regions in an image and judging whether the scene is backlighted or not corresponding to a number of regions having a lightness equal to or larger than a predetermined threshold value; and a second judgement calculating a distribution of color saturation of the image and judging whether the scene is backlighted or not corresponding to the distribution of color saturation.

Generally, when the scene is backlighted, and especially it is a portrait, most of the background is out of focus, so that the value of the color saturation of the background is lower but the value of the lightness of it is higher. Furthermore, the main object which is focused is shaded, so that both of the values of the color saturation and the lightness of the main object are lower. When the scene is actually backlighted, the value of the color saturation of the image is wholly lower, and the distribution of the color saturation is concentrated in a small value. By the above-mentioned backlight scene judging method in accordance with the present invention, the scene is, at first, judged whether it is backlighted or not by using the lightness data with respect to a plurality of the measuring points in the image. When the possibility that the scene is backlighted is higher, the scene is further judged by using the distribution of the color saturation. Thus, it is possible to distinguish the actual backlight scene from a scene including a dark portion. As a result, misjudging of the backlight scene can be prevented.

BRIEF DESCRIPTION OF THE DRAWINGS

FIG. 4 is a table showing a distribution of lightness corresponding to the backlight scene shown in FIG. 3;

FIG. 5 is a table showing divided groups of rectangular regions having the same lightness in FIG. 4;

FIG. 10 is a flowchart showing another modification of the backlight scene judging method in the embodiment.

DETAILED DESCRIPTION OF THE PREFERRED EMBODIMENT OF THE INVENTION

Figure 1:
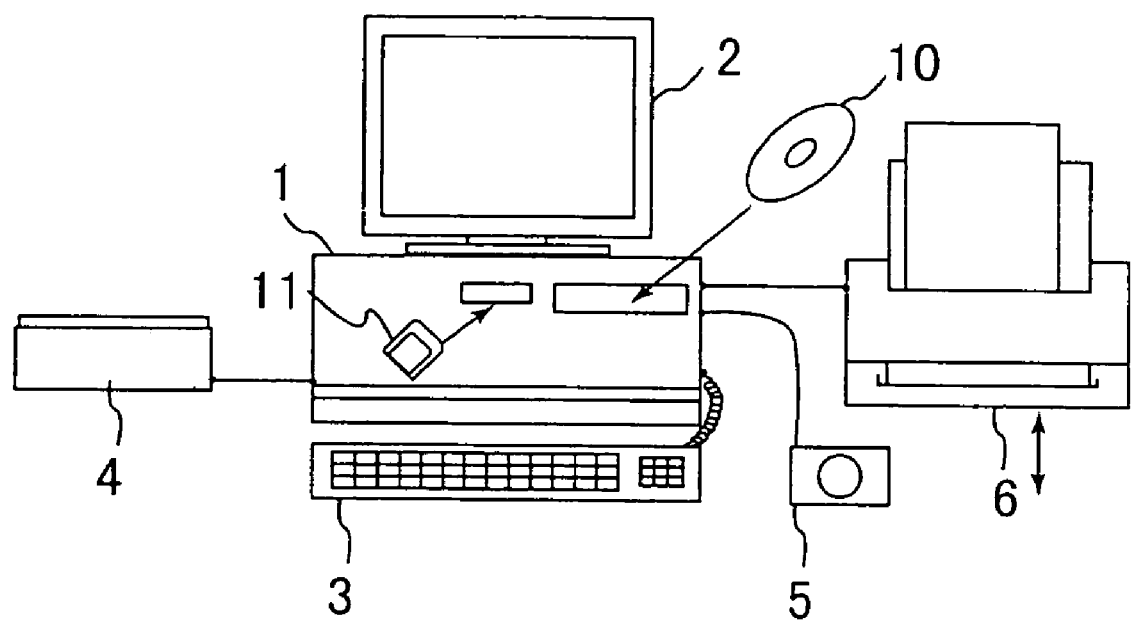
FIG. 1 is front view showing a configuration of an image processing apparatus in an embodiment of the present invention.

An embodiment of the present invention is described. FIG. 1 shows an image processing apparatus used in the embodiment. The image processing apparatus comprises a personal computer 1, an image display apparatus 2 such as a color CRT (cathode ray tube) or a color LCD (liquid crystal display), a keyboard 3, a scanner 4, a digital camera 5, a printer 6, and so on. A program of a backlight scene judging method in the embodiment is, for example, memorized in a recording medium 10 such as a CD-ROM. The program is installed in a hard disc drive unit of the personal computer 1, and the program is started up from the hard disc unit.

Figure 2:
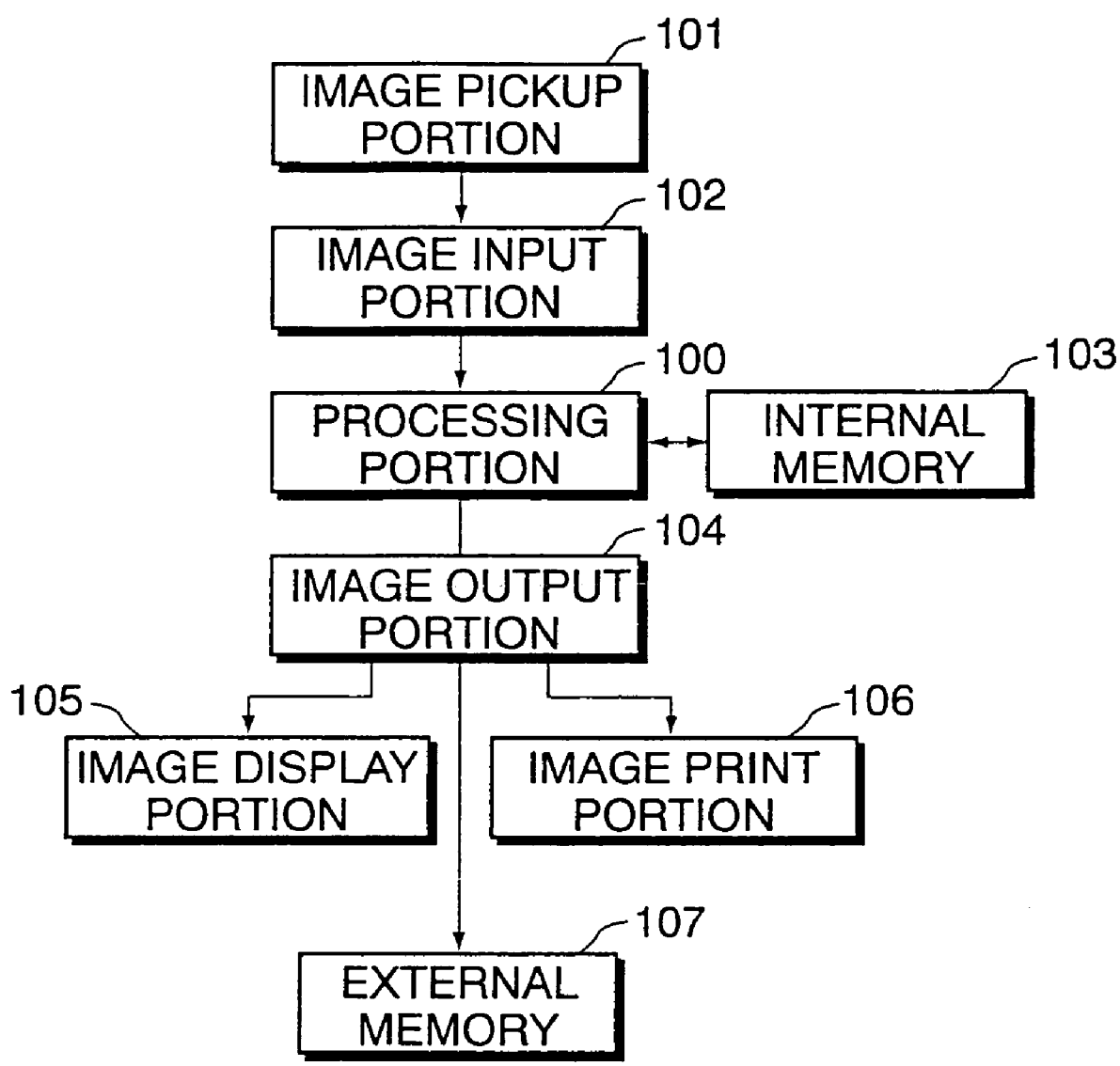
FIG. 2 is a block diagram of the image processing apparatus in the embodiment.

FIG. 2 shows a block diagram of the image processing apparatus in the embodiment. An image pickup portion 101 corresponds to an externally connected image pickup apparatus such as the scanner 4 or the digital camera 5. Digital image data from the image pickup portion 101 are inputted to a processing portion 100 through an image input portion 102 which is configured by an input/output interface, and so on. The processing portion 100, which is configured by a CPU, a RAM, and so on, processes the image data. The image data before, during and after the image processing are temporarily memorized in an internal memory 103 such as the RAM or the hard disc drive unit. The image data processed by the processing portion 100 are inputted to an image display portion 105, an image print portion 106 and an external memory 107 such as a floppy disc, a memory card, or the like, through an image output portion 104 which is configured by an input/output interface, and so on. The processed image is displayed by the image display portion 105 which corresponds to the image display apparatus 2, and selectively printed by the image print portion 106 which corresponds to the printer 6. Furthermore, the processed image can be outputted to another personal computer through LAN or internet service.

Figure 3:
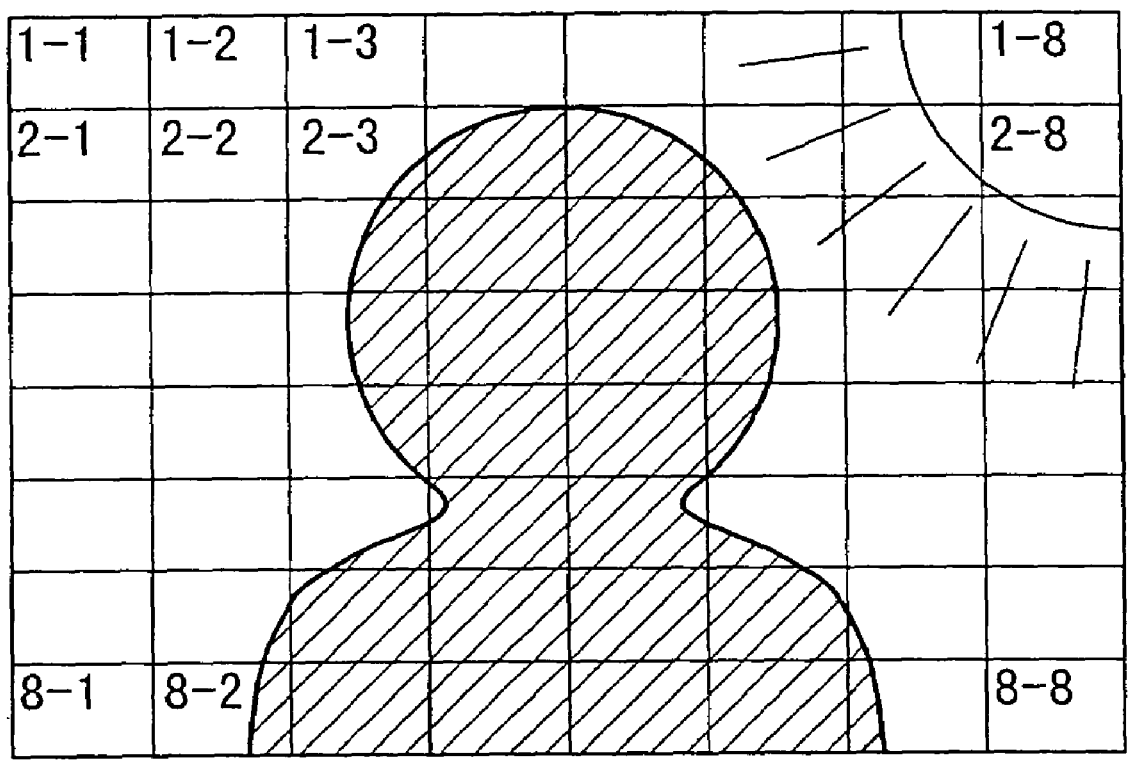
FIG. 3 is a drawing showing an example of an image of a backlight scene taken by, for example, a digital camera.

The backlight scene judging method in the embodiment is described. FIG. 3 shows an example of an image of the backlight scene focused on a solidstate image pickup device of the digital camera 5. In FIG. 3, the hatched region corresponds to a shaded main object, and a highlight region such as a light source exists behind the main object and in upper right side in the figure. The image on the solidstate image pickup device is divided into a plurality of rectangular regions. FIG. 4 is a table showing a distribution of lightness of the image shown in FIG. 3. A numeral in each box of FIG. 4 designates a quantized value of the lightness in the corresponding rectangular region in FIG. 3. FIG. 5 is a table showing divided groups of the rectangular regions respectively having substantially the same lightness of the image shown in FIG. 3. A numeral in each box of FIG. 5 designates a number of the divided groups. The boxes having the same numeral are concluded in the same group.

Figure 6:
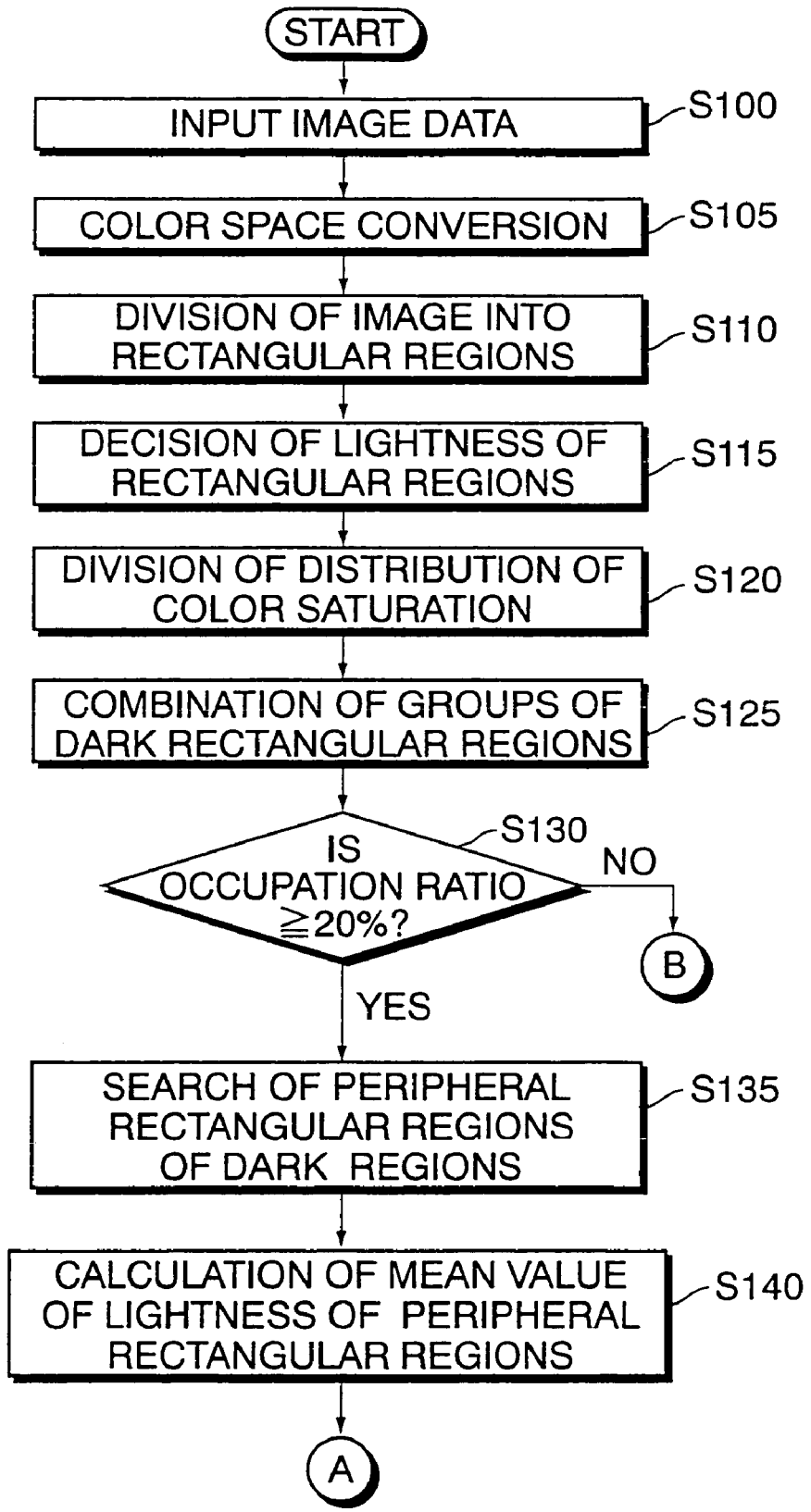
FIG. 6 is a flowchart showing a part of the backlight scene judging method in the embodiment.
Figure 7:
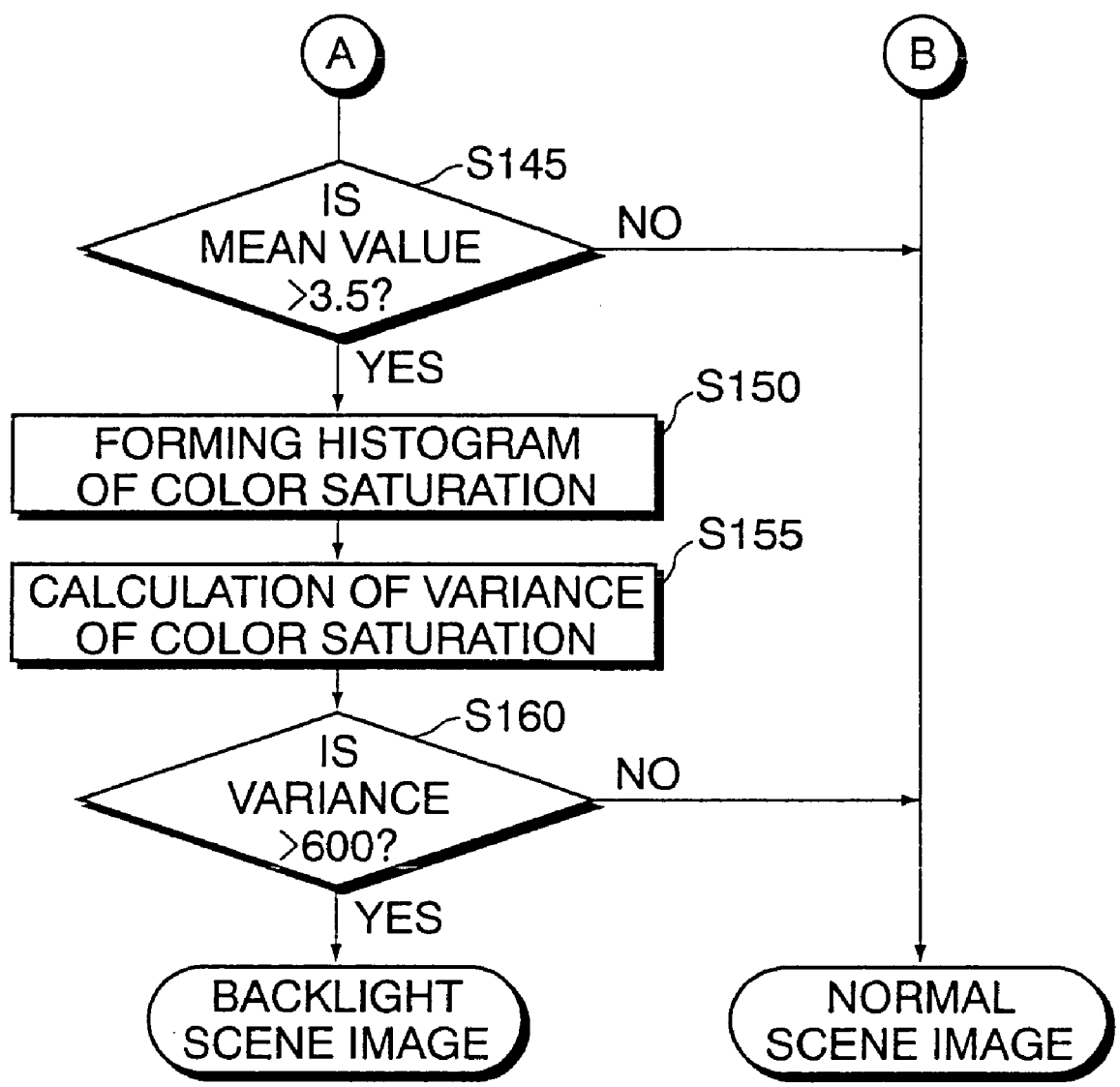
FIG. 7 is a flowchart showing the remainder of the backlight scene judging method in the embodiment.

FIGS. 6 and 7 show a flowchart of the backlight scene judging method in the embodiment. At first, the image pickup portion 101 is controlled so as to input the digitized image data into the image input portion 102 (in step S100).

The image pickup portion 101 takes analogue image data which are taken by the solidstate image pickup device such as CCD, converts the analogue image data to digital image data, and outputs the digitized image data. The image data includes three luminance data corresponding to R (red), G (green) and B (blue) with respect to each pixel of the solidstate image pickup device. When the camera uses single solidstate image pickup device, a luminance datum corresponding to one of R, G and B can be obtained from one pixel. It, however, is possible to obtain three luminance data corresponding to R, G and B with respect to each pixel by interpolating the luminance data from the adjoining pixels. Since the present invention aims to provide the backlight scene judging method, the explanations of the image pickup by the camera and the A/D conversion of the image data are omitted.

When the image data are inputted, the processing portion 100 calculates the values of hue, saturation and lightness with respect to each pixel by using the luminance corresponding to R, G and B (step S105).

Hereupon, when the luminance data corresponding to R, G and B with respect to an optional pixel are respectively designated by symbols "r", "g" and "b", values of the hue "H", the color saturation "S" and the lightness "L" with respect to each pixel are calculated by using the following equations.

$$L=7.3 \times r+7.59 \times g+7.11 \times b \quad c1=7.7 \times r-7.59 \times g-7.11 \times b$$
$$c2=-7.3 \times r-7.59 \times g+7.89 \times b \quad (1)$$

$$H=\tan^{-1}(c1,c2) \quad (2)$$

$$S=((c1)^2+(c2)^2)^{1/2} \quad (3)$$

The above-mentioned processes are used for converting the luminance data corresponding to R, G and B to the data of the hue H, the color saturation S and the lightness L, and called color space conversion. It is preferable that the processed data should be stored in the hard disc drive unit as backup data. Each pixel of the solidstate image pickup device can be regard as a measuring point, and it is equivalent to measure the data of the hue, the color saturation and the lightness at each measuring point.

The processing portion 100 divides an image into a predetermined numbers (eight in the example shown in FIG. 3) of rectangular regions in the vertical direction and the horizontal direction (step S110). In order to simplify the explanation, the divided rectangular regions are serially designated by symbols 1—1, 1-2, . . . 1-8, 2-1,2—2, . . . , 2-8, . . . ,8-1,8-2, . . . ,8—8 from the upper left to the lower right in FIG. 3.

The processing portion 100 quantizes the lightness calculated by the above-mentioned equation (1) with respect to all pixels included in each rectangular region 1—1 to 8—8 into ten steps of 0 to 9. The processing portion 100 forms a histogram of the lightness with respect to each rectangular region, and it decides a value of the lightness shown by the largest number of the pixels as the value of the lightness of the rectangular region. The processing portion 100 executes such quantization with respect to all the rectangular regions 1—1 to 8—8 and decides sixty-four values of the lightness (step S115). An example of the distribution of the lightness is shown in FIG. 4.

In a rectangular region, for example, 2-3 in FIG. 3 including a contour of the shaded main object, the value of the lightness in the main object or in the background having larger area is selected to be the value of the lightness of the rectangular region 2-3. On the other hand, the value of the lightness of the rectangular region 2—2, 2-4, 2-3, or the like adjoining the rectangular region 2-3 is the same as the value of the lightness in the main object or in the background. Thus, it is possible to determine the contour of the main object by comparing the values of the lightness of the rectangular regions. If a mean value of the lightness of the pixels included in a rectangular region is decided as the value of the lightness of the rectangular region, the lightness shows a middle value between the values of the lightness in the main object and in the background. Thus, the contour of the main object will be indistinct.

When the distribution of the lightness is obtained, the processing portion 100 compares a value of the lightness of a rectangular region with values of the lightness of the adjoining rectangular regions, and it defines a plurality of rectangular regions continuously adjoining and having the same lightness or an independent single rectangular region having a different lightness from that of the adjoining rectangular region as a contour region having the same lightness (step S120).

With respect to the first rank in FIG. 4, the values of the lightness L of the adjoining two rectangular regions are compared from the left hand to the right hand in the figure. When the adjoining rectangular regions have the same value of the lightness, they are labeled by the same numeral. With respect to the second rank or the ranks below the second rank, the values of the lightness L of the adjoining two rectangular regions not only on the same rank but also on the same file of the upper rank are compared. So far as the rectangular regions having the same lightness continuously adjoining, the rectangular regions are labeled by the same numeral and the regions labeled by the same numeral are treated as one group having the same lightness. FIG. 5 shows a result of the division of the rectangular regions into a plurality of groups corresponding to the distribution of the lightness shown in FIG. 4.

FIG. 4 and FIG. 5 are compared. All the rectangular regions designated by the numeral "7" are continued in FIG. 4. Thus, these rectangular regions are labeled by numeral "0" in FIG. 5 for designating a first group having the same value of the lightness. Similarly, the rectangular regions designated by the numeral "8" in FIG. 4 are continued, so that these regions are labeled by the numeral "1" in FIG. 5 for designating a second group having the same value of lightness. On the contrary, a group of the rectangular regions 6-2, 6-3, 7-2 and 8-2 (left side numeral designates the number of files and right side numeral designates the number of ranks) which are designated by numeral "6" and another group of the rectangular regions 5-6, 6—6, 6-7, 6-8, 7—7, 7-8, 8-7 and 8—8 which are also designated by the same numeral "6" are departed in FIG. 4, even though they have the same value of the lightness. Thus, the groups are respectively labeled by different numerals "5" and "4" in FIG. 5. The numeral of the label in FIG. 5 designates the number of the appearance of the groups.

Subsequently, the processing portion 100 combines a plurality of groups respectively continued and having the values of the lightness smaller than a predetermined value (step S125). A group of the rectangular regions labeled by numeral "3" in FIG. 5 shows the most dark portion having the value of the lightness "0" (see FIG. 4). Another group of the rectangular regions labeled by numeral "2" shows the secondary dark portion having the value of the lightness "1". The processing portion 100 combines these adjoining two groups.

It is assumed that another group of the rectangular region(s) having the value of the lightness "0" is existed (which is not existed in the example shown in FIGS. 4 and 5). The group is not continued to the above-mentioned group having the value of the lightness "0", so that it will be labeled by different numeral, and not be combined with the above-mentioned group having the value of the lightness "0" and "1". Consequently, it is possible to distinguish a portion in an image having a value of the lightness from another portion having the same value of the lightness as a different object or a different portion of the same object.

In this example, the group of the rectangular regions labeled by the numeral "3" having the value of the lightness "0" and the group of the rectangular regions labeled by numeral "2" having the value of the lightness "1" are combined by the processing portion 100. However, the groups to be combined are not restricted by the example. It is preferable to combine another group of rectangular regions having the values of the lightness "2" which shows the thirdly dark portion.

Subsequently, the processing portion 100 calculates an occupation ration of the number of the rectangular regions included in the combined groups against the total number of the rectangular regions, and judges whether the occupation ratio is equal to or larger than a first predetermined value such as 20% or not (first judgement: step S130).

For example, when the number of the rectangular regions having the value of the lightness equal to or smaller than "1" occupies equal to or larger than 20%, the processing portion 100 judges as the backlight scene.

When it is judged as the backlight scene in the first judgement (YES in step S130), the processing portion 100 searches peripheral rectangular regions adjoining the combined groups of the rectangular regions showing the dark portion in the image (step S135). In the example shown in FIGS. 4 and 5, when the processing portion 100 detects the rectangular region 2-4 which is the first appearance of the combined groups of the rectangular regions, the processing portion 100 defines the rectangular region 1-4 adjoining the rectangular region 2-4 as a peripheral rectangular region. Similarly, the peripheral rectangular regions with respect to the rectangular regions 2-5, 3—3, 3-6 . . . 8-5 included in the combined groups are searched.

When the peripheral rectangular regions are searched, the processing portion 100 calculates a mean value of the lightness of all the searched peripheral rectangular regions (step S140). Furthermore, the processing portion 100 compares the operated mean value with a predetermined value such as the value of the lightness "3.5" (step S145). As mentioned above, the value of the lightness of the rectangular regions included in dark region is "0" or "1". When the mean value of the lightness of the peripheral rectangular regions is equal to or smaller than "3.5", the difference between the values of the lightness is not so large. Thus, it is possible to judge the scene as normal but wholly dark.

When the mean value of the lightness of the peripheral rectangular regions is larger than "3.5" (YES in step S145), the difference between the values of the lightness of the main object and the background is large, and the scene is quite in the bounds of possibility to be backlighted. The processing portion 100 calculates a histogram of the color saturation by using the data of the color saturation of the pixels calculated in step S105 (step S150). Furthermore, the operation portion 100 calculates a variance of the distribution of the color saturation from the histogram (step S155). Subsequently, the processing portion 100 judges whether the variance is smaller than a second predetermined value or not (second judgement: step S160). When the saturation is shown by 256 steps of 0 to 255, the second predetermined value is selected to be 600.

When the scene is portrait or backlighted, most of the background is out of focus, so that the value of the color saturation of the background is lower but the value the lightness of it is higher. Furthermore, the main object which is focused is shaded, so that both of the values of the color saturation and the lightness of the main object are lower. In the actual backlight scene, the value of the color saturation of the image is wholly lower, and the distribution of the color saturation is concentrated in a small value. Thus, when the variance is smaller than the second predetermined value (YES in step S160), the processing portion 100 judges the scene as backlighted.

When the occupation ratio of the dark region is smaller than 20% (NO in step S130), the mean value of the lightness of the peripheral rectangular regions is smaller than "3.5" (NO in step S145) or the variance of the color saturation is larger than 600 (NO in step S160), the processing portion 100 judges the scene as normal.

As mentioned above, the scene is judged whether it is backlighted or not by using lightness (luminance) data of a plurality of points in the image. When the scene is quite in the bounds of possibility to be backlighted, the scene is further judged by using the distribution of the color saturation. Thus, it can be distinguished the actual backlight scene from the scene having partially dark portion. As a result, it can be prevented that the normal scene is erroneously judged as backlighted.

Figure 8:
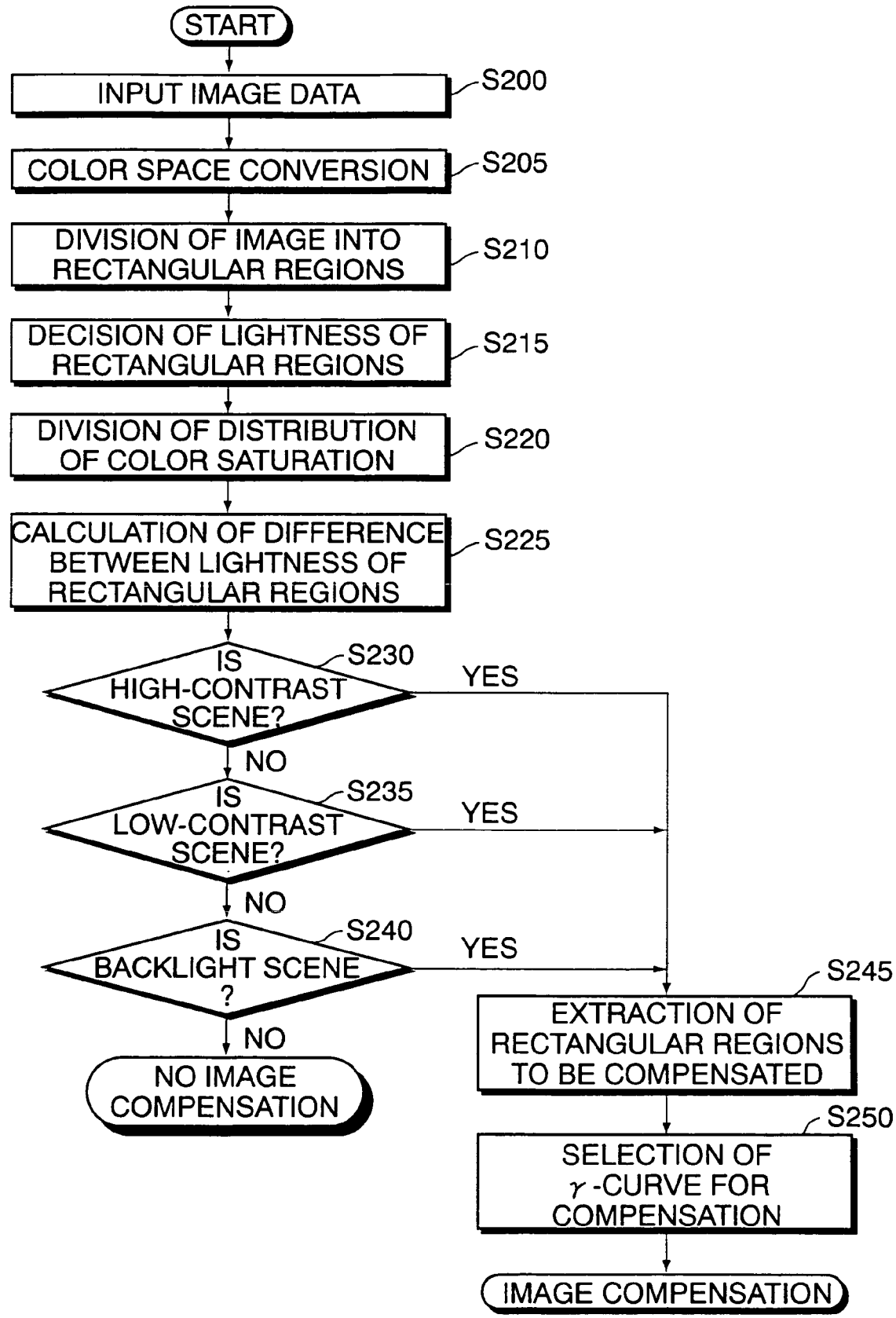
FIG. 8 is a flowchart showing a modification of the backlight scene judging method in the embodiment.
Figure 9A:
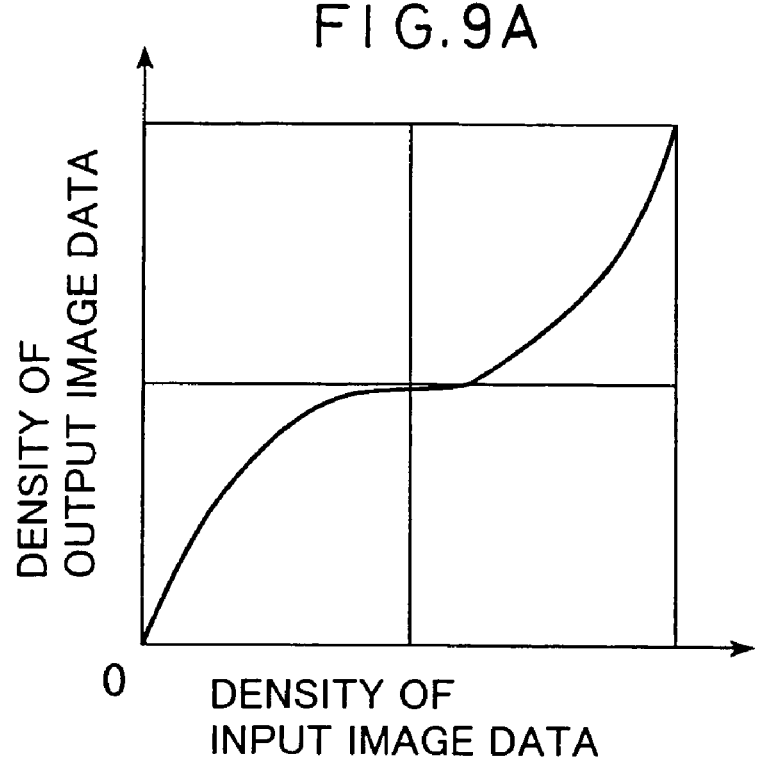
FIGS. 9A and 9B are graphs respectively showing examples of Γ-curves used in the modification shown in FIG. 8.
Figure 9B:
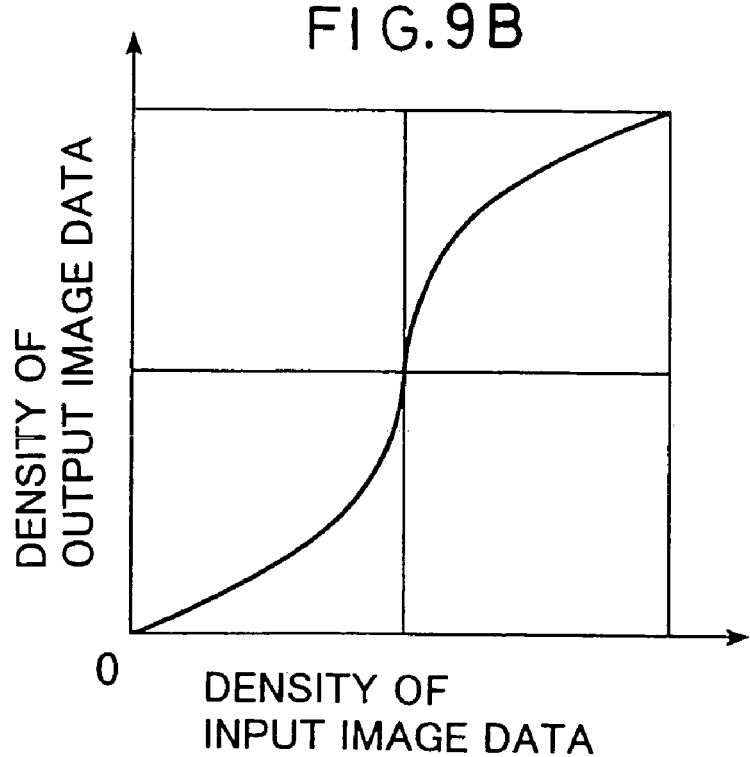

A modification of the embodiment is described. FIG. 8 is a flowchart showing picture scene judgement with image data compensation. FIGS. 9A and 9B respectively show Γ-curve used for compensating the image data corresponding to the result of judgement.

At first, the image pickup portion 101 is controlled so as to input the digitized image data into the image input portion 102 (in step S200), the luminance data corresponding to R, G and B with respect to each pixel are obtained. The processing portion 100 operates the values of the hue, the color saturation and the lightness with respect to each pixel by using the luminance corresponding to R, G and B by the above-mentioned color space conversion method (step S205).

The processing portion 100 divides an image focused on the solidstate image pickup device into a predetermined numbers of rectangular regions in the vertical direction and the horizontal direction (step S210), and it decides values of the lightness with respect to all the rectangular regions (step S215). When the values of the lightness are decided, the processing portion 100 compares a value of the lightness of a rectangular region with values of the lightness of the adjoining rectangular regions, and it divides the image into a plurality of groups of the rectangular regions having the same value of the lightness (step S220).

Subsequently, the processing portion 100 calculates a difference of the values of the lightness between each adjoining two groups (step S225), and judges whether the largest difference is equal to or larger than a third predetermined value, for example, seven or not, that is, whether the scene is high-contrast or not (step S230). The high-contrast scene includes an extremely bright portion and an extremely dark portion in the image, and the occupation ration of the most dark portion is equal to or smaller than 20%. Thus, the high-contrast scene can be distinguished from the backlight scene.

When the processing portion 100 judges that the scene is not high-contrast (NO in step S230), it further judges whether the largest difference is equal to or smaller than a fourth predetermined value, for example, three or not, that is, whether the scene is low-contrast or not (step S235). In the low-contrast scene, the values of the lightness in the image are substantially constant.

When the processing portion 100 judges that the scene is not low-contrast (NO in step S235), it further judges whether the scene is backlighted or not (step S240). The steps for judging the backlight scene are substantially the same as the steps S125 to S160 in the above-mentioned flowchart shown in FIGS. 6 and 7. Thus, the explanation of the judgement of the backlight scene is omitted. When the processing portion 100 judges that the scene is not backlighted (NO in step S240), it is a normal scene, so that the processing portion 100 outputs the image data to the image display apparatus 2, and so on without any compensation.

When the processing portion 100 judges that the scene is high-contrast (YES in step S230), the scene is low-contrast (YES in step S235) or the scene is backlighted (YES in step S240), it extracts a group of the rectangular regions to which the image compensation is executed by using the values of the lightness and the color saturation calculated by the color space conversion in step S205 and the size of the group of the rectangular regions (step S245). The processing portion 100 further selects a suitable Γ-curve, which will be used for compensation, among a plurality of Γ-curves stored in the internal memory 103 (step S250). When the processing portion 100 judges that the scene is high-contrast or backlighted, it selects, for example, a Γ-curve shown in FIG. 9A so as to compensate the values of the lightness of the rectangular regions. When the values of the lightness are too large to saturate, it is made a little small. Alternatively, when the values of the lightness are too small to be shaded, it is made a little large. Similarly, when the processing portion 100 judges that the scene is low-contrast, it selects, for example, a Γ-curve shown in FIG. 9B. It is preferable that the Γ-curves should be stored in the internal memory 103 as lookup tables, and a value corresponding to a density of an input image be selected from the lookup table for a density of an output image.

By the above-mentioned modification, the picture scene taken by the digital camera 5 or the like is judged whether one of the high-contrast, low contrast and the backlighted, and the image data are compensated corresponding to the result of the judgement. Thus, the suitable picture image can be displayed or printed by using the compensated image data.

Another modification of the embodiment is described. FIG. 10 is a flowchart showing picture scene judgement with addition of a keyword. The explanations of the same steps as the above-mentioned flowchart shown in FIG. 8 are omitted.

When the processing portion 100 judges that the scene is high-contrast (YES in step S230), low-contrast (YES in step S235) or backlighted (YES in step S240), the processing portion 100 selects the keyword of high-contrast, low-contrast or backlight (step S260), and memorizes the image data with the keyword in a data base (step S265).

In this modification, even when the processing portion 100 judges the scene as the high-contrast, the low-contrast or the backlighted, it does not compensate the image data but memorizes the image data with the keyword. Thus, it becomes easy to arrange, store and search the image data in the personal computer.

In the above-mentioned embodiment, the program of the backlight scene judging method is executed in the image processing apparatus configured by the personal computer 1 with the image display apparatus 2, the keyboard 3, the scanner 4, the digital camera 5, the printer 6, and so on which are generally known and used. The present invention, however, is not restricted by the description of the embodiment. It is possible to provide a specific apparatus in which the backlight scene judging function, image data compensating function, and so on are combined with an image pickup apparatus such as a digital camera.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A backlight scene judging method comprising steps of:
   a first judgment sensing lightness with respect to a plurality of regions in an image and judging whether the scene is backlighted or not corresponding to a number of regions having a lightness equal to or larger than a predetermined threshold value; and
   a second judgement calculating a distribution of color saturation of the image and judging whether the scene is backlighted or not based directly on the distribution of color saturation, wherein a color saturation value of a background and an object of the image is lower than a predetermined value when the scene is backlight.

2. The backlight scene judging method in accordance with claim 1, wherein the image is divided into a plurality of regions and a lightness is sensed with respect to each region in the first judgement.

3. The backlight scene judging method in accordance with claim 2, wherein the lightness is sensed with respect to each of a plurality of measuring points included in each region, and a value of the lightness shown by the largest number of the measuring points is decided as the value of the lightness in the region in the first judgement.

4. The backlight scene judging method in accordance with claim 3, wherein the value of the lightness of each region is compared with the values of the lightness of adjoining regions, and the regions having the same value of lightness are concluded in a group having the same lightness in the first judgement.

5. The backlight scene judging method in accordance with claim 4, wherein groups having the same lightness equal to or smaller than a predetermined value and serially continued are combined as dark region, and the scene is judged by using an occupation ratio of the dark region against the whole regions in the first judgement.

6. The backlight scene judging method in accordance with claim 4, wherein groups having the same lightness equal to or smaller than a predetermined value and serially continued are combined as dark region, and the scene is judged by a ratio of a mean value of the lightness of the regions included in the dark region against a mean value of the lightness of the adjoining regions to the dark regions having the lightness larger than that of the dark region in the first judgement.

7. The backlight scene judging method in accordance with claim 2, wherein the regions has a rectangular shape for dividing the image into predetermined numbers in the horizontal direction and in the vertical direction.

8. The backlight scene judging method in accordance with claim 1, wherein a histogram of color saturation is calculated by using all the saturation data with respect to the measuring points included in the image, and the scene is judged by comparing a variance of distribution of the histogram with a predetermined threshold value in the second judgement.

9. The backlight scene judging method in accordance with claim 1 further comprising the step of storing results of the first and second judgements with data of the image.

10. The backlight scene judging method in accordance with claim 1, wherein the second judgement is not executed when the scene is judged not to be backlighted in the first judgement.

11. An image processing apparatus comprising:
a memory for storing data with respect to an image;
a lightness sensing portion for dividing an image into a plurality of regions and for sensing lightness with respect to each region;
a color saturation calculating portion for calculating a distribution of color saturation of the image from the data stored in the memory; and
a judging portion for judging whether a scene is backlighted or not by directly using the lightness of each region sensed by the lightness sensing portion and the distribution of the color saturation obtained by the color saturation calculating portion, wherein a color saturation value of a background and an object of the image is lower than a predetermined value when the scene is backlight.

12. The image processing apparatus in accordance with claim 11, wherein the judging portion judges the scene is not backlighted when difference between the lightness of each region in the image is equal to or larger than a first predetermined value, and a ratio of a portion having the lowest value of the lightness against the whole of the image is equal to or less than a second predetermined value.

13. The image processing apparatus in accordance with claim 12, wherein the judging portion judges the scene is not backlighted when the differences between the lightness of each region is equal to or smaller than a third predetermined value which is smaller than the first predetermined value.

14. The image processing apparatus in accordance with claim 11 further comprising an image pickup portion having an image pickup device for picking up an object and outputting data of an image which is stored in the memory.

15. The image processing apparatus in accordance with claim 11 further comprising a display portion for displaying a picture image using the data with respect to the image stored in the memory.

16. The image processing apparatus in accordance with claim 11 further comprising a data compensation portion for compensating the data stored in the memory when the judging portion judged the scene is backlighted.

17. A computer readable medium storing a computer program for processing the following steps when it is stored in an image processing apparatus comprising the steps of:
a first judgement sensing lightness with respect to a plurality of regions in an image and judging whether the scene is backlighted or not based directly on a number of regions having a lightness equal to or larger than a predetermined threshold value; and
a second judgement calculating a distribution of color saturation of the image and judging whether the scene is backlighted or not corresponding to the distribution of color saturation, wherein a color saturation value of a background and an object of the image is lower than a predetermined value when the scene is backlight.

18. The recording medium in accordance with claim 17, wherein the image is divided into a plurality of regions and a lightness is sensed with respect to each region in the first judgement.

19. The recording medium in accordance with claim 18, wherein the lightness is sensed with respect to each of a plurality of measuring points included in each region, and a value of the lightness shown by the largest number of the measuring points is decided as the value of the lightness in the region in the first judgement.

20. The recording medium in accordance with claim 19, wherein the value of the lightness of each region is compared with the values of the lightness of adjoining regions, and the regions having the same value of lightness are concluded in a group having the same lightness in the first judgement.

21. The recording medium in accordance with claim 20, wherein groups having the same lightness equal to or smaller than a predetermined value and serially continued are combined as dark region, and the scene is judged by using an occupation ratio of the dark region against the whole regions in the first judgement.

22. The recording medium in accordance with claim 20, wherein groups having the same lightness equal to or smaller than a predetermined value and serially continued are combined as dark region, and the scene is judged by a ratio of a mean value of the lightness of the regions included in the dark region against a mean value of the lightness of the adjoining regions to the dark regions having the lightness larger than that of the dark region in the first judgment.

23. The recording medium in accordance with claim 18, wherein the regions has a rectangular shape for dividing the image into predetermined numbers in the horizontal direction and in the vertical direction.

24. The recording medium in accordance with claim 17, wherein a histogram of color saturation is calculated by using all the saturation data with respect to the measuring points included in the image, and the scene is judged by comparing a variance of distribution of the histogram with a predetermined threshold value in the second judgement.

25. The recording medium in accordance with claim 17 further comprising the step of storing results of the first and second judgements with data of the image.

26. The recording medium in accordance with claim 17, wherein the second judgement is not executed when the scene is judged not to be backlighted in the first judgement.

* * * * *